June 20, 1939.  L. D. GOODHUE ET AL  2,163,000
SEDIMENTATION APPARATUS
Filed June 14, 1938
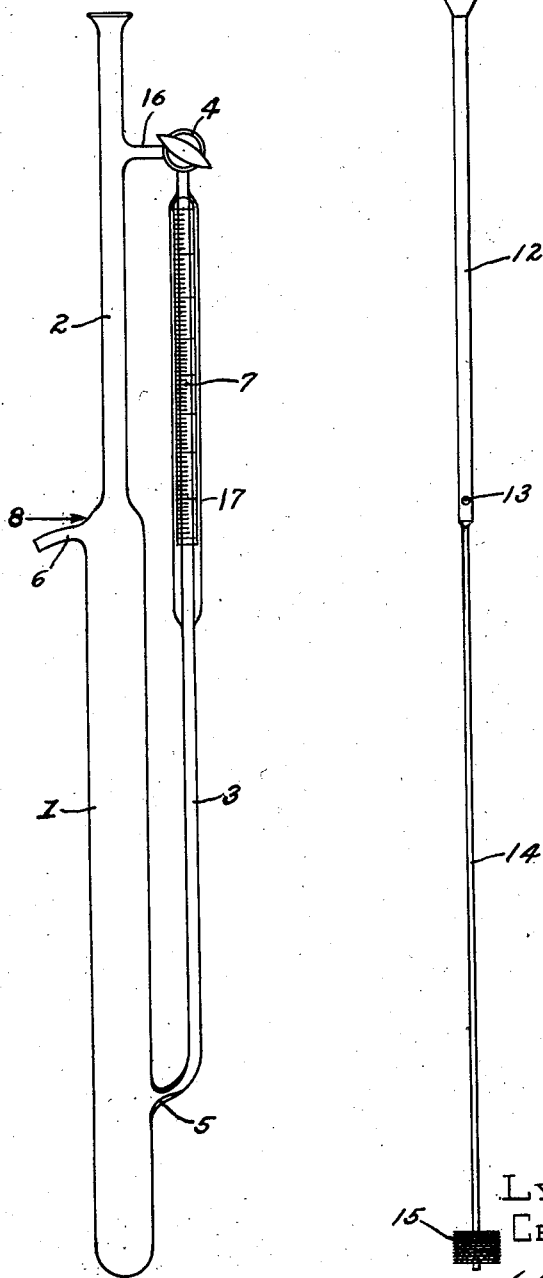
Inventors
LYLE D. GOODHUE
CHARLES M. SMITH
By
Attorneys Patented June 20, 1939

2,163,000

UNITED STATES PATENT OFFICE 2,163,000

SEDIMENTATION APPARATUS

Lyle D. Goodhue, Berwyn, Md., and Charles M. Smith, Washington, D. C.; dedicated to the free use of the People in the territory of the United States Application June 14, 1938, Serial No. 213,642

4 Claims. (Cl. 73—51)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to a new and useful sedimentation apparatus for the mechanical analysis of fine powders, and more particularly, it is of the differential manometer-type employing two immiscible liquids, one of which is the sedimentation medium.

Many methods have been heretofore used to observe the sedimentation of suspensions of finely divided materials in a liquid medium in order to obtain data for calculating the particle size distribution. The first accurate method embraced the immersion of one pan of an analytical balance in the suspension, recording the weight of the material settled on the pan at frequent intervals. Another method frequently employed comprises the determination of the change in specific gravity or density of the suspension during a sedimentation. This latter method is considered to be more accurate than the first-mentioned method. Many different means and ways have been suggested for measuring this change in specific gravity, such as hydrometers, water manometers, pentane manometers, wafer devices, light absorption, and so forth.

An object of our invention is to provide a sedimentation apparatus of the type mentioned whereby the change in specific gravity or density of a suspension can be easily and accurately observed during the course of a sedimentation analysis.

Another object of our invention is to provide a compact, inexpensive, yet sensitive apparatus, which can be used in the average laboratory without special equipment and without special training of the operator.

One of the advantages of our invention resides in the provision of suspending mediums, such as dilute ethyl and isopropyl alcohols, by virtue of which the length of the apparatus is considerably reduced, thereby making it more convenient in use and practical in application.

The following description, considered together with the accompanying drawing, will disclose this invention more fully, its construction and operation of parts, and further objects and advantages thereof will be apparent.

In the drawing:

Figure 1 is a diagrammatic elevational view of an illustrative embodiment of our invention, with the funnel and brush means removed.

Figure 2 is a diagrammatic elevational view of said funnel and brush means.

Referring with more particularity to the drawing, in which like numerals designate like parts, a large glass tube 1 is closed at the bottom and attached at the top to a smaller tube 2. A still smaller tube 3 communicates with and is attached to the tube 2 near its top through the right angled stopcock 4 and cross tube 16. Said tube 3 also communicates with the tube 1 through the tapered capillary 5 near the lower end of the apparatus. A side tube 6 is attached near the top of the tube 1. The upper part of the tube 3 is provided with a scale 7 of any desired type or material, such as paper, which scale is held in place by the glass jacket 17 around the upper part of the tube 3. The entire apparatus, except for the paper scale, is preferably made of heat resistant glass.

The combination stirring apparatus and funnel shown diagrammatically in Figure 2, consists of the metal funnel 11 attached to the metal tube 12 perforated by a plurality of holes 13 (only one shown). A solid metal rod 14 having a brush 15 at its lower extremity is fixedly attached to the bottom of the closed end of the tube 12. This assembly is of such a length that if inserted in the apparatus in Figure 1, the brush 15 just reaches the bottom of tube 1 when the funnel 11 is resting on the top of tube 2. When in this position, the holes 13 should be just above the level indicated by the numeral 8.

The following dimensions for this apparatus are preferred, but are not to be construed as limiting the scope of this invention:

The glass tube 1: Approximately 2.6 cm. in diameter and 50 cm. long.

The tube 2: Approximately 1.5 cm. in diameter and 22 cm. long.

The tube 3: About 5 mm. in diameter.

The side tube 6: About 6 mm. in diameter.

The bore of stopcock 4: At least 3 mm. in diameter.

The cross tube 16: At least 10 mm. in diameter.

The capillary tube 5: The larger end at the point of attachment to the tube 1 should be about 10 mm., tapering sharply to a diameter of 2 mm. before it opens into the tube 3.

The holes 13: About 1 mm. in diameter.

In addition to the above specified dimensions for the elements of the apparatus, it has been found satisfactory to dispose the stopcock 4 about 6 cm. from the top of the apparatus and the tapered capillary 5 about 10 cm. from the lower end of the apparatus.

One of the preferred methods of operating this apparatus is as follows:

The apparatus is cleaned and rinsed a few times with the suspending medium and filled with it to above the stopcock 4 which is opened. In this way the side tube 3 is completely filled with the liquid. The stopcock 4 is now closed and all or nearly all of the liquid in the tubes 1 and 2 is poured out into a suitable container and the sample of concentrated suspension introduced. The capillary 5 prevents loss of liquid from the tube 3. The suspending liquid is then poured back into the apparatus until it almost overflows at the tube 6. The combination funnel and stirring apparatus is now introduced and the level of the liquid adjusted by means of the tube 6 which is then closed with a rubber cap or other suitable means (not shown). The whole apparatus is now placed in a constant temperature water bath with a glass front so the scale can be observed without removing the apparatus. The suspension is now thoroughly stirred by an up and down motion of the stirring brush 15 and allowed to stand a few minutes to come to a constant temperature. The stirring apparatus is not removed during the determination. The suspension is again stirred rapidly just before introducing the top liquid consisting of a colored liquid of slightly lower density than the suspension in tube 1. This top liquid is poured through the funnel 11. The holes 13 cause the liquid to be sprayed against the sides of the apparatus from where it runs down gently to the surface of the suspension without disturbing it or mixing with it. The stopcock 4 is opened as soon as the tube 16 is filled, permitting the colored liquid to flow through the stopcock 4 and displace some of the suspending medium in the tube 3. The junction between these two liquids forms the indicator which is read on the scale 7. As the particles of solid in suspension in tube 1 settle and pass by the tapered capillary 5, their effect on the density is lost and consequently the average density of the suspension changes. This causes the boundary between the colored top liquid and the suspending medium in tube 3 to move down the scale 7. Readings are taken at the beginning of the experiment and at intervals during the course of the sedimentation. The curve formed by using scale readings against time as co-ordinate points is used to calculate the particle size distribution. The first reading is usually taken at 2 minutes and successive readings taken often enough to get a good curve. To determine the zero point on the scale, a blank determination without any solid particles is carried out.

For a suspending medium we have found dilute ethyl alcohol to have very desirable properties. Its surface tension is low enough to work well in the apparatus and its viscosity reaches a point near 50 percent which is nearly 2.5 times that of water. With coarse materials this is a decided advantage. Dilute alcohol also behaves near enough like water so that many substances used to stabilize suspension in water can be used in this medium. Dilute isopropyl and methyl alcohol have also been used to a limited extent. The greater part of our determinations have been made in dilute ethyl alcohol made by mixing one volume of 95 percent alcohol with one volume of water.

As a top liquid decahydronaphthalene adjusted to the proper density with 1,2,4-trichlorobenzene has been found to be very satisfactory. This liquid is washed several times with the suspending medium. An oil soluble dye is added to make the boundary easily visible. Other liquids may be used but they must be immiscible with the suspending medium. The difference in density between the two liquids should preferably be from .020 to .030 g. per cc.

The purpose of using a top liquid in our apparatus is to magnify the movement of the indicating surface over the scale. The amount of movement obtained by a certain quantity of material suspended in the suspending medium can be expressed mathematically by the following equation:

$$R = \frac{H(d_s - d_m)}{(d_m - d_t)}$$

where $R$=the rise or movement over the scale, $H$=falling height, $d_s$=density of suspension, $d_m$=density of medium, and $d_t$=density of top liquid. The amount of movement is therefore directly proportional to the amount of material settling out and inversely proportional to the difference in the densities of the two liquids.

Having thus described our invention, we claim:

1. A differential manometer-type sedimentation apparatus, comprising a lower sedimentation tube; a narrower upper tube disposed on top of and communicating with said sedimentation tube; an outlet tube near the junction of said upper and lower tubes; an indicator tube disposed parallel to said upper and lower tubes a tapered capillary tube connecting said indicator tube to said lower tube at a point above its bottom; a cross tube connecting said indicator tube to said upper tube at a point below its top; a stopcock disposed between said cross tube and said indicator tube; and a glass enclosed scale disposed on said indicator tube.

2. An article of manufacture comprising a tube narrowed at its upper end, a measuring tube parallel to said first-mentioned tube, a capillary tube connecting said measuring tube to a point on said first-mentioned tube above its bottom, a cross tube connecting said measuring tube to a point below the top of said first-mentioned tube, and inlet and outlet means for said first-mentioned tube.

3. A sedimentation gage comprising a suspension tube, a measuring tube, a capillary tube connecting said measuring tube to said suspension tube at a point above its bottom, a stop-cock on top of said measuring tube and a cross tube connecting said stop-cock to said suspension tube at a point below its top, and inlet and outlet means for said suspension tube.

4. A sedimentation gage comprising a tube for holding a material in suspension, an overflow outlet in said tube, a measuring tube parallel to said suspension tube, a capillary tube connecting said measuring tube to said suspension tube at a point above its bottom, a cross tube connecting said measuuring tube to said suspension tube at a point below its top, and a stop-cock for said cross tube.

LYLE D. GOODHUE.
CHARLES M. SMITH.